Patented May 14, 1929.

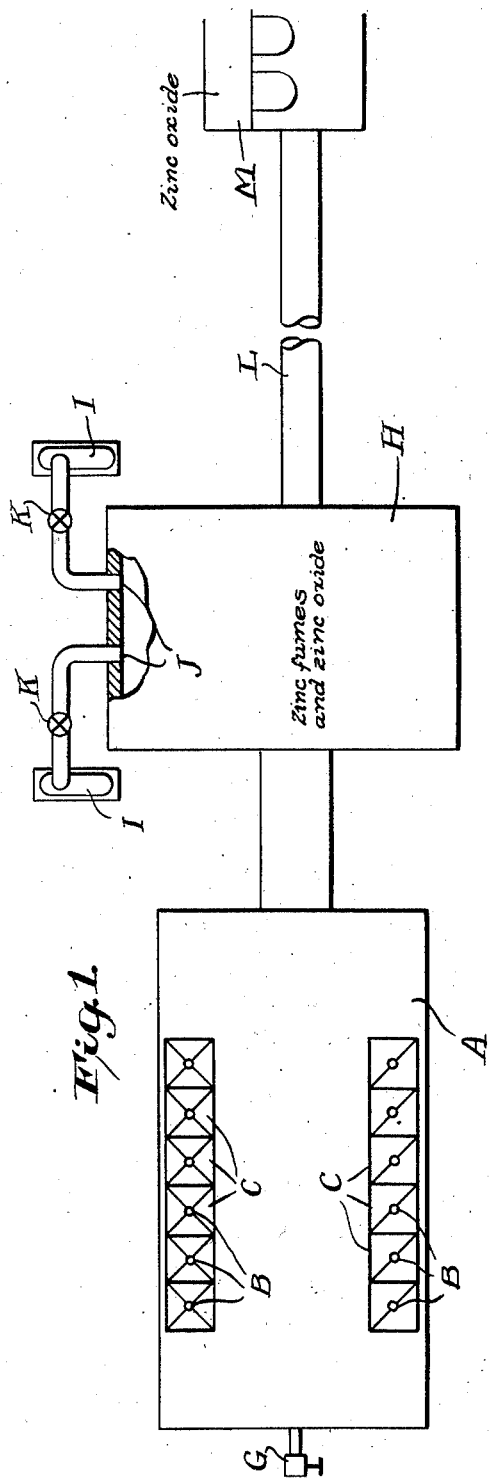
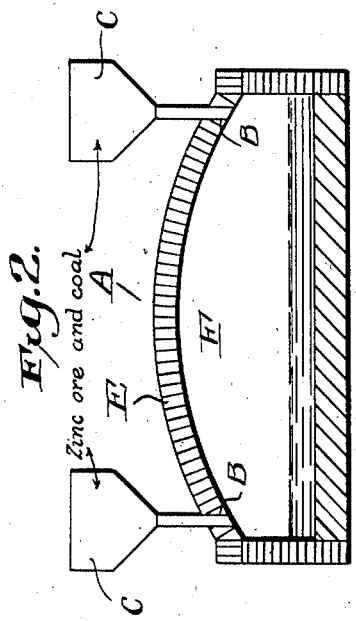

1,712,553

UNITED STATES PATENT OFFICE.

CHARLES A. H. DE SAULLES, OF WESTBURY, NEW YORK, ASSIGNOR TO AMERICAN SMELTING AND REFINING COMPANY, OF NEW YORK, N. Y., A CORPORATION OF NEW JERSEY.

PROCESS OF RECOVERING ZINC OXIDE.

Application filed December 31, 1921. Serial No. 526,306.

This invention relates to the production of zinc oxide of commercial purity directly from ores without subjecting the product to re-treatment or secondary refining processes.

The invention consists broadly in treating zinciferous ores in relatively large masses, reducing the zinc compounds in the ore to zinc fume or vapor in an atmosphere capable of oxidizing the fume or vapor and entirely free from impurities or from any foreign materials that will discolor zinc oxide or prevent recovery of a commercial product, and in controlling the temperature during the reduction of the ore and the oxidation of the fume.

Heretofore many attempts have been made to produce zinc oxide directly from ore treated in large tonnage in open furnaces such as the modern reverberatory furnace. Such processes have in the past failed to produce a commercial product, although it has been possible by such prior processes to obtain inferior grades of oxide which in all cases have required re-treatment or refining of some kind in order to acquire the necessary degree of purity and the proper color that is essential in commercial product.

According to my process, the treatment of the ore may be carried out in a suitable furnace of the usual dimensions and construction with respect to the hearth and walls. It is very desirable, however, to have the roof elevated a sufficient distance from the hearth to provide a primary combustion chamber or space above the level of the slag, wherein the primary oxidation of the volatile fume from the volatile metallic constituents of the ore may occur. Preferably the ore is fed to the furnace at a plurality of points adjacent to the side wall of the furnace, and is fed continuously in relatively small quantities so that it will spread itself over the bath of molten slag resting on the hearth and little, if any, of the ore will become submerged beneath the slag level prior to the volatilization of the zinc and other volatile metals.

A suitable reducing material, such as coal, is mixed with the ore as it is fed to the furnace, which acts as a reducing agent. The coal or other reducing agent is supplied in particles sufficiently fine to produce a rapid reduction of the metals in the ore. No special sizing of the reducing agent is necessary, however, provided it is commingled intimately with the ore in quantities in order to accomplish the desired rapid reduction.

The furnace should be fired by gas which is entirely free from foreign matter and from the products of combustion, such as particles of ash. Either natural gas or producer gas may be used, but if the latter is employed, it should first be passed through a scrubber, which may be of any well known construction.

The temperature of the furnace is maintained relatively high, preferably from 2200° F. to 2400° F., in order that the smelting may proceed as rapidly as possible. As the zinc is reduced it immediately volatilizes and passes into the upper part or combustion space of the furnace where it is partly, if not wholly, oxidized, since it is neither practical nor necessary according to this process to maintain a reducing or neutral atmosphere in the furnace. The zinc oxide that has been formed commingles with any unoxidized fume or vapor and passes from the upper part of the furnace into a combustion chamber located adjacent to the furnace, which is so proportioned with respect to the combustion space of the furnace itself and the rate of reduction of the ore that the velocity of movement of the fume or vapor as well as the temperature of the furnace may be accurately regulated and controlled. An excess of a suitable oxidizing agent such as air may be introduced into the combustion chamber in desired quantity depending on the amount of fume or vapor supplied to the chamber until all of the fume or vapor has become completely oxidized. The temperature of the combustion chamber is considerably lower than the temperature of the furnace, for example about 1700° F. to 1800° F. From the combustion chamber the gases with the oxide in suspension are conducted to a bag house, where the oxide is recovered in the usual manner.

In the accompanying drawings I have shown one form of apparatus for carrying out my improved process, in which:

Fig. 1 is a diagrammatic view of the furnace, combustion chamber and bag-house, showing the relative positions thereof.

Fig. 2 is a cross-section through the furnace and the combustion chamber.

Referring to the drawings, the furnace A, preferably rectangular in form, is provided with suitable inlets B communicating with hoppers C, which may be arranged at intervals as desired in the roof adjacent to the side walls. The ore is fed to the furnace in such quantities as may be needed from time to time, and preferably forms an embankment D extending above the slag line resting against the side walls.

The furnace is provided with a relatively high arch E forming a combustion space F above the normal slag level of the furnace. Suitable burners G are arranged at one end of the furnace, which are fed from a source of gas supply, such as a producer plant, not shown.

Adjacent to the furnace is a combustion chamber H, which may be of any desired form, but having sufficient capacity to control the movement and velocity of the gases and fume from the furnace. Blowers I may be provided, if desired. Suitable inlets J are provided in the combustion chamber for admitting air or other oxidizing agent, which may be controlled by any well known means, as the valve K. The combustion chamber communicates through a flue L with a bag-house or chamber M, where the zinc oxide is recovered.

In operation, the ore to be treated is fed to the furnace mixed with the proper quantity of coal or other reducing agent to reduce the zinc contained therein. If the ore is a mixture or complex ore containing sulfids and copper, it may be necessary to add suitable fluxes to slag the waste and form a matte with the copper and other non-volatile metals, both the matte and the slag being tapped off in the usual manner. If the ore is a simple ore in which zinc is the only or principal metal of value, the silica, gangue and other material in the ore forms a slag resting on the floor of the furnace, which may be tapped off from time to time. As the ore is reduced and the zinc volatilized, the fume or vapor is partly or wholly oxidized in the slightly oxidizing atmosphere of the upper portion of the furnace, whence it is drawn into the combustion chamber. There it comes into contact with an excess of air or other oxidizing agent, so that any remaining fume or vapor of metallic zinc is immediately oxidized to form zinc oxide.

The temperature of the combustion chamber is regulated so as to remain approximately constant at a temperature somewhat lower than the temperature of the furnace and has a definite relationship both as to the temperature of the combustion space of the furnace itself and as to the velocity of the gases and the oxide suspended therein.

After the oxidation has been completely effected, the gases with the zinc oxide still in suspension are conducted through the flues to the bag-house or other settling or separating means, where the oxide is separated in the usual manner in its commercial form.

By means of this process I am enabled to produce zinc oxide of standard fineness and acceptable color, possessing in every respect the specifications of commercial zinc oxide without any further or special treatment whatever. The process is continuous, since the ore may be fed to the furnace in desired and regulated quantities, depending on the size and capacity of the furnace, and the slag may be tapped out at proper intervals to maintain the slag level at any preferred point. The conditions surrounding the formation and recovery of the zinc oxide are under complete control at all times, which is of the utmost importance in operations involving the treatment of zinc ores in furnaces having a relatively large capacity.

The process is particularly adapted for the handling of large tonnages of ore that is free from impurities or metals such as sulphur, lead and copper, and where the principal or only values consist of the zinc that is contained in the ores.

What I claim as my invention is:

1. The method of producing zinc oxide of commercial purity from ore, which consists in continuously reducing zinc ore on a slag bath in a furnace having a slightly oxidizing atmosphere free from impurities, removing the volatilized zinc products to a separate chamber having a lower temperature than the furnace and containing an oxidizing agent in excess, and then recovering the zinc oxide.

2. The herein-described process for the continuous production of zinc oxide from ores containing zinc, which consists in continuously feeding relatively small quantities of the ore with a reducing material onto a slag bath in a furnace maintained at smelting temperature and having a non-reducing atmosphere, removing the volatilized zinc products to a separate chamber having an excess of an oxidizing agent therein to oxidize all of the metallic zinc commingled with the fume, and then removing the oxide from said chamber and recovering the same.

3. The herein-described process for the continuous production of zinc oxide from ores containing zinc, which consists in continuously feeding predetermined quantities of the ores together with a reducing agent onto a bath formed from the smelting of the ore, maintaining an oxidizing atmosphere above the level of the bath that is free from impurities adapted to contaminate the zinc oxide, continuously removing the volatile zinc products from said furnace to a separate chamber having an excess of oxidizing agent therein, and then removing the oxide from said combustion chamber and recovering the same.

4. The process of continuously producing zinc oxide direct from ores, which consists in feeding the ore containing the zinc and a reducing agent onto a slag bath in a furnace maintained at smelting temperature, supplying a heated gaseous oxidizing agent to the interior of said furnace that is free from impurities adapted to contaminate the zinc oxide, continuously withdrawing portions of said oxidizing agent and the volatile zinc carried thereby, subjecting the fume to an excess of oxidizing agent, and then collecting the resulting zinc oxide.

5. The process of producing zinc oxide from zinc bearing ore, which comprises introducing finely divided ore in contact with a reducing agent onto a bath of molten slag, reducing and volatilizing the zinc from said ore in the form of fume, removing said fume, oxidizing the same to zinc oxide and recovering said oxide.

6. The process of producing zinc oxide from zinc bearing ore which comprises forming a bath of molten slag and floating the mixture of said ore and a reducing agent upon said slag, said mixture forming a thin layer, maintaining said layer at a smelting temperature whereby the zinc is reduced and volatilized to form a fume and the gangue is dissolved in the slag, withdrawing said fume to a separate chamber, oxidizing said fume to produce zinc oxide, and recovering said oxide.

7. The process of producing zinc oxide from zinc bearing ores in a furnace, which comprises maintaining said furnace at a smelting temperature and introducing said ore mixed with fine reducing material to said furnace at the sides thereof, heating the furnace by combustible gases introduced into said furnace at a point remote from the sides thereof and above the ore, removing fume from said furnace to a chamber maintained at a lower temperature, introducing an oxidizing agent into said chamber and recovering zinc oxide fume.

8. The process of producing zinc oxide in a furnace, which comprises maintaining a bath of molten slag in said furnace, introducing finely divided ore and reducing material in small quantities above said slag bath, maintaining a smelting temperature in the furnace by burning combustible gases above said slag whereby the zinc in said ore is reduced and separated therefrom and converted to a fume, removing said fume to a separate chamber, completely oxidizing said fume therein, and removing and recovering the zinc oxide.

9. The process of producing zinc oxide from zinc bearing ore, which comprises introducing a mixture of finely divided ore and reducing agent into a bath of molten slag, maintaining a non-reducing atmosphere above said bath whereby the zinc is removed from said ore and forms a fume, removing said fume to a chamber containing an excess of oxidizing agent whereby zinc oxide is produced, removing and recovering the zinc oxide.

10. The process of removing zinc from zinciferous ores which comprises maintaining a bath of molten slag, introducing finely divided zinc ore and reducing material in small quantities to said slag, and introducing combustible gases above said slag at a point remote from that at which said mixture is introduced whereby a minimum amount of dust is picked up thereby.

11. The method of recovering zinc oxide from zinciferous ores which comprises introducing said ores in a finely divided condition mixed with a solid reducing material to a bath of molten slag, maintained at a temperature of 2200° F. to 2400° F., introducing combustion supporting gases above said slag at a point remote from the point of introduction of said ores, said gases being substantially free from impurities, removing the fumes to a separate chamber maintained at a temperature of substantially 1800° F., introducing an excess of oxidizing gases into said chamber, removing zinc oxide fume therefrom and recovering the zinc oxide.

Signed at New York, in the county of New York and State of New York, this 21st day of December, A. D. 1921.

CHARLES A. H. DE SAULLES.